United States Patent
Berger et al.

(10) Patent No.: US 11,731,757 B2
(45) Date of Patent: Aug. 22, 2023

(54) ROTOR BLADE PITCH TRAJECTORY CONTROL

(71) Applicant: Karem Aircraft, Inc., Lake Forest, CA (US)

(72) Inventors: Thomas Karl Berger, Winchester, CA (US); David Wade Milanes, Ann Arbor, MI (US); James Stewart Robertson, Murrieta, CA (US)

( * ) Notice: Subject to any disclaimer, the term of this patent is extended or adjusted under 35 U.S.C. 154(b) by 0 days.

(21) Appl. No.: 17/520,424

(22) Filed: Nov. 5, 2021

(65) Prior Publication Data

US 2023/0142439 A1    May 11, 2023

(51) Int. Cl.
  *B64C 27/615* (2006.01)
  *B64C 27/72* (2006.01)
  *B64C 27/57* (2006.01)

(52) U.S. Cl.
  CPC ............ *B64C 27/615* (2013.01); *B64C 27/57* (2013.01); *B64C 27/72* (2013.01); *B64C 2027/7205* (2013.01)

(58) Field of Classification Search
  CPC .. B64C 27/72; B64C 27/57; B64C 2027/7205
  See application file for complete search history.

(56) References Cited

U.S. PATENT DOCUMENTS

| | | | |
|---|---|---|---|
| 4,379,678 A | 4/1983 | Carlock | |
| 4,930,988 A | 6/1990 | Griffith | |
| 8,201,771 B2 | 6/2012 | Kessler et al. | |
| 9,203,459 B2 | 12/2015 | Sane et al. | |
| 11,008,096 B1 * | 5/2021 | Rhinehart | B64C 27/57 |
| 2008/0279685 A1 | 11/2008 | Kessler | |
| 2015/0050142 A1 | 2/2015 | Knag | |
| 2016/0159475 A1 * | 6/2016 | Schank | B64C 27/64 |
| | | | 416/31 |
| 2018/0022449 A1 * | 1/2018 | Sahani | B64C 27/57 |
| | | | 416/1 |
| 2018/0339770 A1 * | 11/2018 | Brunken | B64C 11/06 |
| 2019/0009898 A1 * | 1/2019 | Bosworth | B64C 27/605 |
| 2019/0168867 A1 * | 6/2019 | Hartmann | B64C 27/72 |
| 2021/0197962 A1 * | 7/2021 | Brand | G05D 1/0676 |

FOREIGN PATENT DOCUMENTS

| | | | | |
|---|---|---|---|---|
| EP | 3431393 A1 * | 1/2019 | ............ | B64C 27/08 |
| KR | 20200081086 A | 7/2020 | | |
| WO | WO-2019215019 A1 * | 11/2019 | ............ | B64C 27/68 |

* cited by examiner

*Primary Examiner* — Courtney D Heinle
*Assistant Examiner* — Ryan C Clark
(74) *Attorney, Agent, or Firm* — Fish IP Law, LLP (57) ABSTRACT

An aircraft uses trajectory-based control algorithms for blade pitch (or twist). This approach greatly enhances the ability of the actuator to accurately achieve the desired blade pitch and to track the commanded pitch position. An actuator includes an electronic rotor blade controller that converts communicated or desired changes in pitch (or similar parameter) to actual physical effects that match the desired changes as closely as possible. The controller preferably includes a motor drive circuit, such as an h-bridge, a communication circuit for connection to external commands, and a processor with associated enabling circuitry (e.g. memory, I/O) to coordinate and implement the control.

13 Claims, 4 Drawing Sheets

ROTOR BLADE PITCH TRAJECTORY CONTROL

FIELD OF THE INVENTION

The field of the invention is rotorcraft.

BACKGROUND

Propellers and rotors comprise lifting surfaces azimuthally distributed around the axis of a rotating shaft. They are generally utilized to provide propulsive forces for controlling the motion of an aircraft. Propellers and rotors may have one or more blades, and examples with two, three, four, five, six, and seven blades are common.

Blade Pitch Control

Some propellers utilize blades whose blade pitch (lifting surface angle of incidence relative to the tangential direction due to shaft rotation) are mechanically fixed (fixed-pitch propellers). Other propellers, and some rotors incorporate pitch-control mechanisms, enabling blade pitch for all blades to simultaneously be adjusted (collective pitch propellers and rotors). Many rotors also incorporate pitch control mechanisms that enable controlling both the collective pitch control and repeating sinusoidal pitch variation as a function of rotor blade azimuth (cyclic pitch control). A swashplate is generally used to induce the pitch motion of the blades, translating the control inputs from the pilot (or automated systems). These mechanisms produce identical pitch as a function of azimuth for each blade.

Higher Harmonic Control (HHC)

Typical swashplate control is done at timescales of pilot aircraft control inputs, slow relative to the rotation of the rotor. In this mode the collective and cyclic control inputs result in a constant pitch (collective) with sinusoidal (cyclic) variation around the azimuth. The sinusoidal motion is typically forced into variation only in the first harmonic. That is, the variation is proportional to $\sin(n\theta+\varphi)$ with $n=1$, where $\theta$ is the azimuth and $\varphi$ is a phase offset. This is called 1P variation.

Sinusoidal motion based on higher harmonics, $n=2, 3, 4, 5$ or higher, called 2P, 3P, 4P, 5P and so on, is also possible. When using a swashplate, the motion of the swashplate must be rapid enough to induce the higher harmonic content. In general, it is not able to be performed directly by the pilot but relies on high-speed actuators. Making use of a swashplate for higher harmonic control (HHC) typically relies on actuators in the stationary frame (below the swashplate) augmenting the basic collective and cyclic control inputs.

Though HHC with a swashplate has some limitations, it does provide for the possibility of limiting vibration, acoustic noise, control input power, and overall aircraft power requirements, which is why it has been investigated and implemented. It is applicable to both edgewise rotorcraft and tiltrotors as well as rotors and propellers generically. Typically, vibration reduction is the primary purpose, and it is particularly relevant for rotorcraft at high-speed edgewise flight, high advance ratios.

Individual Blade Control (IBC)

HHC using a swashplate can be limited depending on the number of blades. A simple thought experiment serves to illustrate the point: if the swashplate is actuated by three actuators (which defines the plane of the swashplate) and the number of blades exceeds three, a unique pitch for each of the blades is not possible because the number of controlled variables exceeds the number of controlling variables. Individual blade control (IBC) solves this challenge and represents an extension beyond swashplate control, wherein the pitch angle of each blade can be independently controlled as a function of time (or as a function of blade azimuth depending on application). Such individual blade control provides direct control of the pitch of each blade and removes the swashplate restrictions to pitch trajectory vs azimuth and eliminates the forced relationship between the pitch of the individual blades.

In practice, IBC is accomplished in one of three ways: 1) actuation of the blade pitch at the root of the blade, 2) movement of trailing edge control surfaces, or 3) active blade twist variation. These can all be broken into two additional classes of implementation, either augmenting primary control implemented by a swashplate or providing primary control directly together with any higher harmonic components. In any case, the typical implementation includes some mechanical actuation in the rotating frame. (A scheme of multiple swashplates transferring actuation from the stationary frame to the rotating frame, or similar arrangements, can be imagined but are mechanically complex.)

Blade Pitch Trajectory

The blade pitch trajectory is most naturally described as a function of time $f(t)$ or a function of rotor azimuth $f(\theta)$. However, the description can be more generic. Trajectory means a description of blade pitch amplitude (including blade twist, actuator extension, or any parametrized surrogate) in terms of azimuth or time (or other parameter). This complete description of the desired blade pitch as function of azimuth or other parameter is not necessarily what is achieved through the control implementation but is the goal of the control algorithm; there will always be some error in what is achieved versus what is desired, some level of inaccuracy.

Harmonic Decomposition

The trajectory may be equivalently decomposed into a Fourier series of harmonic components of the fundamental frequency, $$f(\theta) = \Sigma_{n=0}^{N} a_n \cos n\theta + b_n \sin n\theta.$$

For purposes of capturing dynamic information and transmitting control parameters from the stationary frame to the rotating frame, the harmonic decomposition has advantages. Rotorcraft vibration is typically at frequencies of some multiple of the fundamental, 1P, 2P, 3P, and so on, unless it is not related to the rotor itself. So, vibration reduction control algorithms can be more easily implemented and expressed in terms of harmonic decomposition. Similarly, acoustic noise reduction or control input power reduction is related to harmonic control components.

In practice, the harmonic decomposition is not taken over infinite multiples of the fundamental, rather it is limited to where the vibration is relevant and the control is possible. For example, the decomposition may be truncated at, say, the fifth harmonic, 5P. Therefore, the "complete" description of the trajectory is then possible in terms of a handful of parameters that change slowly over time relative to the change in rotor azimuth. With this advantage, data communication and computation can benefit from the more slowly changing harmonic components, as compared to real-time signals based directly on $f(t)$, considering the goal of capturing motion at multiples of the fundamental frequency. Further, the transition from the stationary frame to the rotating frame only exasperates the challenge, as communication may be through a less capable, less reliable channel (a slip ring, for example) and space constraints may eliminate the possibility of high-performance computation directly in the rotating frame. In short, harmonic decomposition has advantages in succinctly describing the blade pitch trajectory in terms of more slowly changing parameters, accommodating slower processing capabilities, and allowing for less capable communications channels.

Blade Pitch Control Implementation

The algorithms for control of the rotor blade pitch versus azimuth for IBC (or swashplate HHC) may be implemented as an open loop feedforward approach, closed loop with feedback based on dynamic sensors, or as a combination. The development of the algorithms may be based on physical models, detailed computational analysis, feedback control, or a combination; all may be tuned based on experimental or direct flight data. The algorithms may be optimized for vibration reduction, acoustic noise reduction, or other goals. The details of the algorithm development are complex, with many examples found in the literature.

The implementation of the algorithms depends on the ability of the physical hardware to achieve the desired results and on the software and data communication approach and execution. Fundamentally, the success of the algorithm in achieving the goal for which it was optimized depends not only on the details of the algorithm and the physical hardware, but also on the control approach for implementing the algorithm with the physical hardware. That is, for the algorithm to be effective, the control of blade pitch (or twist or trailing edge effector) must be accurate.

The standard control scheme is typically some version of a proportional-integral-derivative (PID) controller. The literature on the topic is ubiquitous; only a short, simplified summary is provided here. The PID controller uses feedback on three terms, as indicated by the name of the approach. The feedback is calculated based on the error between the desired set point and the actual achieved process variable. The proportional term would typically be a feedback based on the error between the desired position or blade pitch and the realized blade pitch. The integral term sums up that error over time and provides control to drive any residual or continuing error back to zero, eliminating any offset or bias. Finally, the derivative term involves the rate of change of the blade pitch, often called the "velocity" term. Again, feedback is based on the error of the desired "velocity", usually taken as zero, and the "velocity" at the present time. In practice, there may be nested PID loops. For example, one loop may control the blade pitch with current or voltage through windings of an electro-mechanical motor, while another loop controls the current or voltage itself using the duty cycle of the FET in a motor-control h-bridge.

Regardless of the complexity, in the prior art, the typical implementation of IBC (or HHC) actuation employs direct time domain signals provided to each actuator, or a translation of the harmonic decomposition and azimuth (or time) signal to the time-based control signal, $f(t)$. Ultimately the same time-based control signal is provided to the actuator either as an analog control signal or as a digital control signal. Though communication or computation may have been performed using a harmonic decomposition description of a blade pitch trajectory, the control algorithm is done in terms of the rapidly changing commands, $f(t)$. The accuracy of the achieved blade pitch relative to the commanded blade pitch $f(t)$ depends on the actuator performance and the implementation and tuning of the actuator control algorithm.

All publications herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention. Unless a contrary meaning is explicitly stated, all ranges are inclusive of their endpoints, and open-ended ranges are to be interpreted as bounded on the open end by commercially feasible embodiments.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

Thus, there is still a need for enhanced accuracy in the control implementation. Greater accuracy in achieved blade pitch versus the desired or commanded blade pitch provides better performance against key metrics, such as vibration reduction, control power, acoustic signature, or whatever parameter is being optimized for. Previous control schemes have relied on purely time-based (or equivalent parameter such as azimuth) blade pitch control. Alternative methods can increase the achieved accuracy and therefore improve the performance against the relevant metrics.

SUMMARY OF THE INVENTION

Trajectory-Based Control

An alternative approach to the typical control implementation, and a central element of the invention here, is applying trajectory-based control algorithms for blade pitch (or twist). This approach greatly enhances the ability of the actuator to accurately achieve the desired blade pitch and to track the commanded pitch position.

The control is implemented on some physical hardware. The rotor will be comprised of at least one rotor blade and for most practical implementations at least a first and second rotor blade. At minimum a first actuator will be used to physically modify the pitch, twist, or control surface position of the blade. The actuator includes an electronic rotor blade controller that converts communicated or desired changes in pitch (or similar parameter) to actual physical effects that match the desired changes as closely as possible. The electronic rotor blade controller will typically be comprised of a motor drive circuit, such as an h-bridge, a communication circuit for connection to external commands, and a processor with associated enabling circuitry (e.g. memory, I/O) to coordinate and implement the control. The processor may be a CPU, a microprocessor, or combine functions in a microcontroller or similar device.

To provide for the excellent tracking, a trajectory-based position control is implemented in which the trajectory is provided along with blade azimuth position as time advances (or simply time is provided from which azimuth is calculated based on a more slowly varying RPM signal). The trajectory may be in terms of harmonic components (as derived from collective and cyclic inputs, as well as higher harmonic components optimized for the desired goal) or may not be decomposed and provided directly as $f(\theta)$. Again, trajectory means a description of blade pitch amplitude (including blade twist, actuator extension, or any parametrized surrogate) in terms of azimuth or time (or other parameter). Trajectory-based control means a control that includes the complete trajectory, including the desired target values for present, past, and future parameters under control. This more complete description inherently includes higher order derivative terms like velocity, acceleration, jerk, etc. or the analogues of the derivatives with respect to azimuth or other parameter. The trajectory may describe the rotor blade pitch over a full rotation or a segment of the full rotation; the distinguishing feature is that it provides a description of the blade pitch at more than a single point in time or at a single azimuth point. Simple feedback or feedforward can now be performed against all the known parameters of the trajectory. As typical, feedback can be based on the error of desired position versus present position. But now, the feedback calculated from the trajectory-based "velocity" (blade pitch rate) is simply enabled. That is, feedback from the error of the present velocity versus the desired trajectory-based velocity is possible, rather than a fixed desired velocity, say zero. Further, feedback or feedforward on the higher derivatives is also easily enabled. The trajectory-based acceleration is known or calculated from $f(t)$ and can be easily incorporated in the control loop. If the trajectory is provided in terms of harmonic components of sine and cosine functions, the higher order derivative terms are trivially provided, as they are simply related sine and cosine functions.

The computation for the control of the actuator position as a function of azimuth is best implemented directly in the processors of each of the actuator drive modules, or electronic rotor blade controller. This provides for better tracking than employing rapidly changing actuator extension/retraction commands. In one implementation, this is because the actuator uses the trajectory and the known derivative to provide feedback on position and velocity and, in one implementation, the known acceleration at each azimuth is used as a feedforward term to provide for much tighter control than a simple position feedback scheme.

Also, in one implementation, an integral feedback term is added to provide good performance under time varying loads. For this implementation, an azimuthally dependent integral feedback is adopted because a simple integral feedback term is ineffective at higher RPM; a gain large enough to correct position error over the short time scales needed results in instability. The full rotation of the rotor is broken into azimuth segments or bins with the error integrated within each bin. The binned errors are then interpolated as a smooth function of azimuth. The interpolation relies on Fourier decomposition and reconstruction up to the first several harmonic frequencies (5P, for example). As evidenced by this implementation example, direct-trajectory control results in blade pitch position errors significantly lower than using a standard PID control scheme.

Several added benefits are realized with the implementation of the trajectory-based control. It not only provides excellent performance but also affords enhanced reliability. Because the trajectory can be provided using a limited set of slowly varying parameters, as is the case for harmonic decomposition, some immunity to communication glitches is made available and a lower command data rate is required. Though the blade azimuth is a rapidly varying signal, it is highly predictable based on slowly varying RPM benefiting from typically relatively high rotor inertias. Therefore, a complimentary filter on azimuth provides a robust prediction of azimuth as time progresses providing the immunity to short interruptions in communications, or azimuth can be simply calculated from RPM and time, with an occasional position recalibration. And, as implemented with trajectory-based control, no translation to time-based parameters is required prior to the final actuator control processor. The IBC actuators only need communications on the timescales of the rate of change of cyclic and collective (and any desired higher harmonic components) not at the blade pitch change time scales.

Overview of Trajectory-Based Control

Trajectory control of blade pitch (or twist) comprises a description of blade pitch amplitude (including blade twist, actuator extension, or any parametrized surrogate) in terms of azimuth or time (or other surrogate parameter) with feedback or feedforward control based on that trajectory description. The description covers a range of azimuth values, either a full rotation or a segment. The approach contrasts with control provided as a rapid succession of discrete position commands provided at regular time intervals implemented with a standard PID controller.

The advantage is that the trajectory includes inherent higher order derivative terms, such as velocity (pitch/twist change rate) and acceleration, as a function of azimuth (or equivalent parameter), which allows for additional control feedback and control feedforward and therefore greater accuracy.

Further accuracy is available using integral feedback control implemented with azimuthal dependence in contrast to a typical running integral. The position error is collected and integrated within azimuth bins and interpolated (smoothed), perhaps using harmonic decomposition and reconstruction up to the desired multiple of the base rotational frequency. This approach allows for tighter control (better correspondence between the commanded and achieved position) and stability not achievable with a typical integral control approach. This example can be generalized as accuracy optimization based on the accumulated errors from repeated cycles through segments of the circular motion.

Various objects, features, aspects, and advantages of the inventive subject matter will become more apparent from the following detailed description of preferred embodiments, along with the accompanying drawing figures in which like numerals represent like components.

DETAILED DESCRIPTION

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

The following describes first the components and configurations relevant to provide the setting in which the primary embodiments of the invention are applied and then describes the invention and several exemplar embodiments of the invention itself. As such, the typical rotor control mechanism is described followed by descriptions of the typical approach and configurations that enable HHC and IBC. The motivation for and benefits are covered in the background section and not repeated here. Following the establishment of the context, the details of the trajectory-based control are described.

Figure 1:
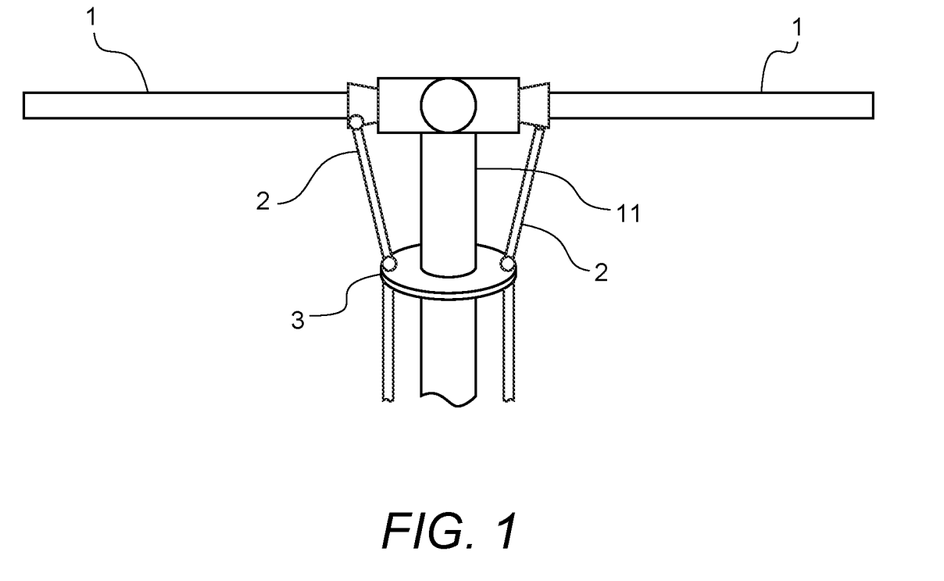
FIG. 1 is a diagrammatic representation of a standard rotor configuration using a swashplate.

FIG. 1 generally depicts an aircraft rotor system having two or more rotor blades 1 a pitch control rod 2 capable of changing the pitch of the rotor blade 1 relative to the airstream, thereby altering the lift generated by that blade 1. The swashplate 3 connects control inputs from the stationary frame to the rotating frame. The tilt of the swashplate 3 determines the pitch of the rotor blades 1 as they move around in their rotational path. This is a graphical description of the typical conventional rotor control mechanism and linkages for collective and cyclic rotor pitch control.

Figure 2:
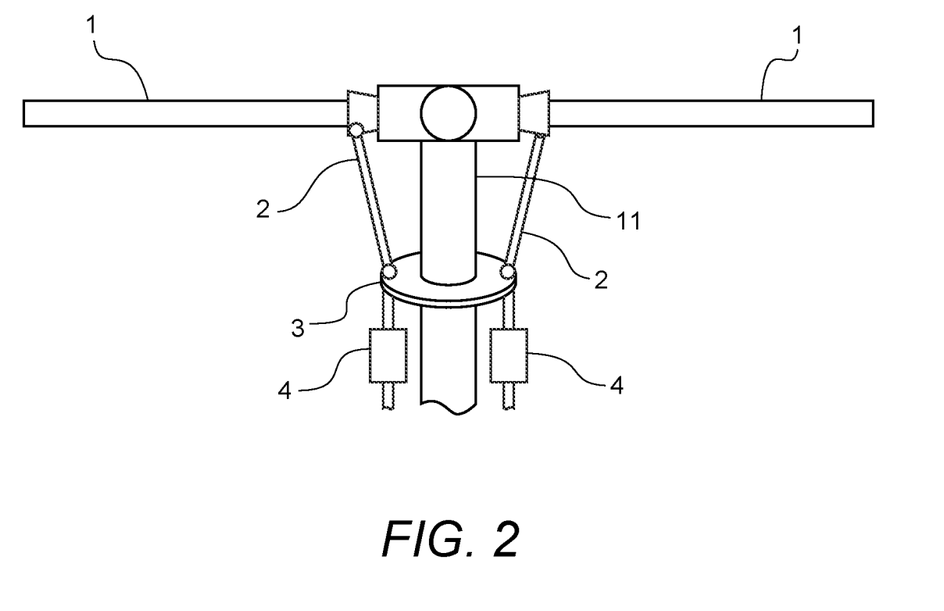
FIG. 2 is a diagrammatic representation of a rotor with Higher Harmonic Control (HHC) enabled by actuators installed "below" the swashplate, in the static frame.

FIG. 2 depicts the same conventional rotor control mechanism but replaces pilot input through purely mechanical linkages with actuators 4. The actuators 4 include mechanical components and a motor or motors to effect the physical change in blade pitch (twist). They also include an electronic rotor blade controller that coordinates the motion of the motor based on the communicated or desired blade pitch. These actuators 4 may be electromechanical, hydraulic, hybrid, or powered in any other way. In this configuration, the actuators are shown below the swashplate 3, meaning that the pitch of each blade 1 is mechanically related to the pitch of the other blades through the geometric constraints of the swashplate 3. Because this configuration includes actuator 4 control of the swashplate 3, not direct control of the rotor blades 1, the standard approach uses three independent actuators that will define the level and tilt of the swashplate. This is related to the fact of geometry that three points determine a plane in space. The conventional mode of operation for this arrangement is simply to replace the mechanical linkage with an electrical, hydraulic, or other mechanism for the purposes of control force reduction and comfort for the pilot, enhanced control power, packaging, weight savings, and/or reliability enhancements. From the pilot perspective, the pilot control is like that realized though mechanical linkage alone.

This configuration does enable HHC, as discussed above. If additional higher frequency motion is combined with the relatively slow pilot inputs for collective and cyclic control, additional benefits can be realized, such as vibration reduction and other, as discussed above. Because some rotorcraft are already equipped with actuator control of the swashplate 3 and the packaging and interface options are more advantageous "below" the swashplate 3 versus "above" the swashplate 3, this arrangement is favorable for introducing rotor control at frequencies (2P+) greater than collective or cyclic (1P) control made possible by simple swashplate 3 control. It should be noted that direct pilot inputs for these higher frequencies are assumed not to be possible. Some computer or equivalent control of the actuators is needed to superimpose the higher harmonic components onto the collective and cyclic inputs. Even with higher frequency control inputs managed at computer-capable speeds, this method still does not enable arbitrary control of the rotor blades 1 because of the geometric constraints of the swashplate 3.

Figure 3:
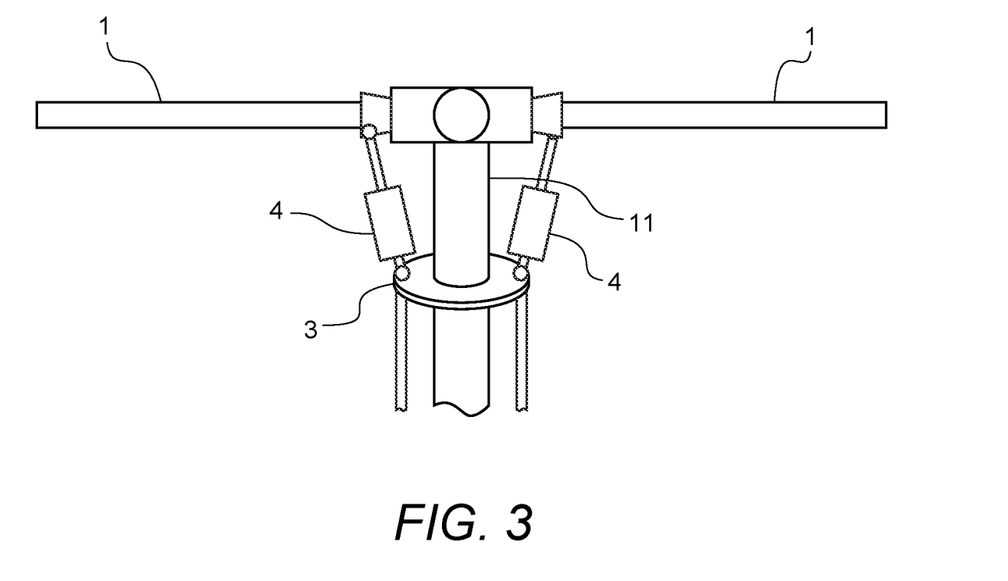
FIG. 3 is a diagrammatic representation of a rotor with individual blade control (IBC) enabled by actuators installed "above" the swashplate, in the rotating frame. In this configuration, the collective and cyclic (1P) changes are typically still done by the swashplate, while the higher harmonica content (2P and greater) is included by extension and retraction of the actuator at frequencies of 2P and greater.

FIG. 3 differs from the previous illustration in that it depicts actuators 4 above the swashplate 3. In this configuration there is a direct linkage from the actuators 4 to the rotor blades 1; it is not mediated by the swashplate 3, which forces the constraints discussed above. Note that this configuration allows individual blade control. There is an actuator 4 that can move each rotor blade 1 individually; there is one actuator per blade. Notice that the swashplate is still able to effect rotor blade pitch change. The typical approach here is for pilot input of cyclic and collective to determine the level and tilt of the swashplate 3, thereby controlling the 0P and 1P blade pitch variation. Typically, only the higher frequency components (2P+) are introduced by the actuators 4, though it is possible to use them to augment cyclic and collective inputs. Because the amplitudes of blade pitch variation for the higher frequency components (2P+) are smaller than those for the lower ones (0P, 1P), the required travel amplitude of the actuators in this configuration are limited, which allows for a smaller and lighter actuator 4 as compared to IBC implementations including primary (collective and cyclic) control using the actuators 4. Also, because the actuators 4 are not responsible for the lower frequency movement in addition to the higher frequency movement they will have lower power requirements. This configuration is often preferred for these reasons and because it is more readily adaptable to existing rotorcraft that have swashplate 3 enabled control.

Figure 4:
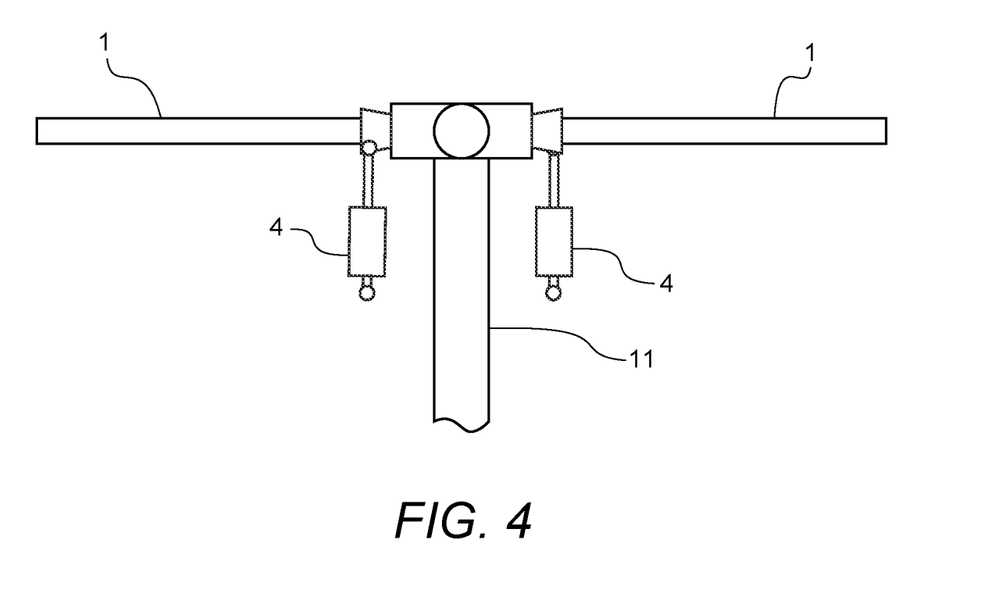
FIG. 4 is a diagrammatic representation of a rotor with individual blade control (IBC) and no swashplate. In this configuration, the actuators cause all rotor and rotor blade control motions including the primary control of collective and cyclic (1P) and any higher harmonic content (2P and greater).

FIG. 4 depicts IBC implemented with no swashplate 3. In this configuration, the actuators are responsible for primary control (collective and cyclic) and any higher frequency components (2P+). Again, the typical approach is to have one actuator 4 per rotor blade 1. Though the actuators 4 would, in general, require more travel and power and therefore have more size and weight as compared to the previous configuration, there are some advantages. The swashplate 3 and associated control linkages can be removed, saving weight, and adding reliability. Reliability may also be enhanced by the redundancy available for the actuators 4 and the elimination of the single points of failure for the swashplate 3 configuration.

Both this configuration, FIG. 4, and the previous configuration, FIG. 3, constitute IBC and differ in that way from the configuration presented in FIG. 2, which is often called an HHC configuration by contrast. This can be confusing in the literature because IBC enables control of higher harmonic (2P+) motion but is often contrasted with HHC when describing a particular configuration. An IBC configuration typically has one actuator 4 per rotor blade 1 while HHC configuration typically has three actuators below the swashplate 3; both can introduce higher harmonic motion.

Figure 5:
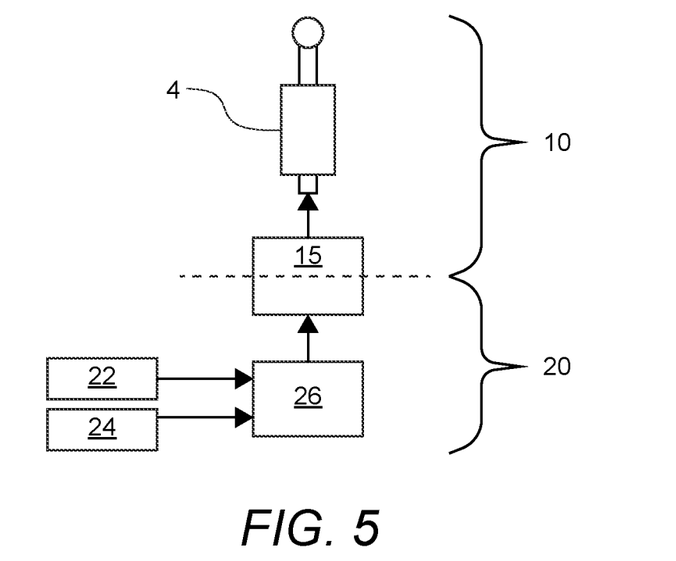
FIG. 5 is a diagrammatic representation of the standard control implementation for an IBC actuator, either mounted "above" the swashplate or in a no-swashplate configuration. The time domain control signal is passed through a slip ring (or equivalent device, e.g., optical or RF communications) with the signal remaining in the time domain.

FIG. 5 depicts the actuator 4 control scheme for IBC. It is relevant for IBC with no swashplate 3 or IBC implemented to augment the cyclic and collective control enabled by a swashplate 3. The communication signals from a computer or CPU are transmitted to the IBC actuators 4 through a slip ring. Here, "slip ring" is inclusive of any device that transmits data from the stationary frame to the rotating frame 10, including bi-directional communication. The physical instantiation may employ any means, including electrical, optical, and/or RF connections. Any protocol is relevant here including analog, serial, parallel, ethernet, or other. Regardless of mode or protocol, the control signal, $f(t)$, depicted here is a time varying signal in the time domain. The control signals are serial and do not include control directives for the future or the past. In its simplest and typical form, the control signal is a continuous string of actuator 4 extension (rotation) commands intended to be followed by the actuator in the order that it receives it and close to the instant it is received.

Figure 6:
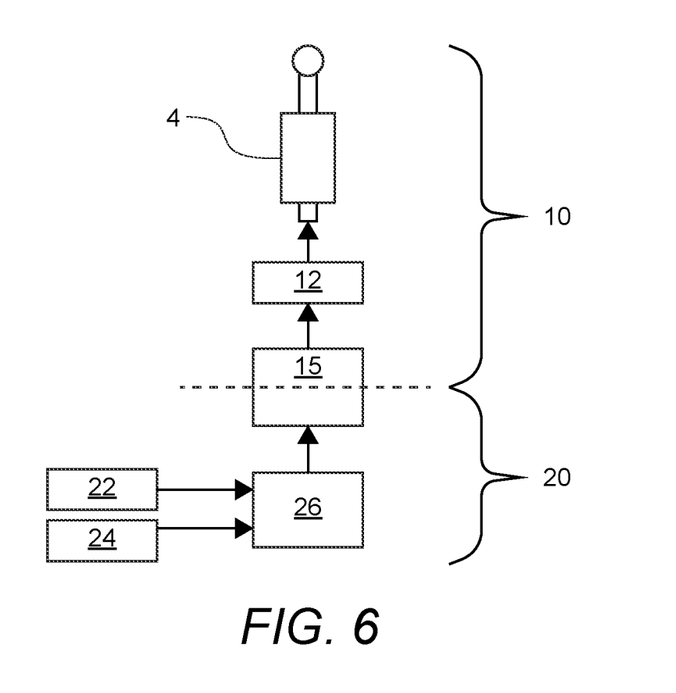
FIG. 6 is a diagrammatic representation of another standard control implementation for an IBC actuator, either mounted "above" the swashplate or in a no-swashplate configuration, using harmonic decomposition for greater signal integrity in the communication transition from the static frame to the rotating frame. The harmonic content of the control signal or the frequency domain control signal is passed through a slip ring (or equivalent device, e.g., optical or RF communications) with the signal converted into the time domain before being conveyed to the actuator.

FIG. 6 shows a similar configuration to the previous figure but now adds encoding and decoding or translation steps. Because the communication path of a slip ring is typically degraded relative to the paths on either side of the slip ring, it is advantageous to reduce the amount of data flowing across that interface in order to improve the integrity of that signal. This figure shows a translation of the time domain signal into the frequency or azimuth domain prior to the slip ring interface and then a translation back into the time domain once the slip ring communication path is passed through. The typical transform results can be expressed by $f(\theta)$ as shown in FIG. 6.

That is, the control signal in the time domain is processed by a Fourier transform, or equivalent transformation, so that it can be expressed in terms of azimuth or similar parameter. This has the advantage that the Fourier components, in terms of azimuth, are, in general, more slowly changing over time than the time domain signal and therefore the bandwidth requirements for the slip ring communication channel can be reduced and the signal integrity improved.

Considering it first in terms of the lower order harmonic components $a_0$, $a_1$, $b_1$, these just describe the collective and two cyclic amplitudes. So, if the cyclic and collective are changing at the timescales of the pilot inputs, slowly, then these parameters also change slowly and therefore can be transmitted at lower bandwidth across the interface. The same holds for the higher harmonic components $a_n$, $b_n$, for $n \geq 2$. They typically would change on the timescales of the vehicle flight dynamics, much slower than the time domain signal describing the high frequency motion of the actuator at 2 per rev frequencies or higher. Once across the slip ring, the signal is typically translated back into the time domain as the rapidly changing function $f(t)$ that directly commands the extension (or rotation) of the IBC actuator 4 in the rotating frame. The translation is typically performed using an azimuth sensor output $\theta(t)$, though it can also be accomplished using the known RPM and a time signal. Again, this is relevant for IBC implementations with or without a swashplate 3.

Figure 7:
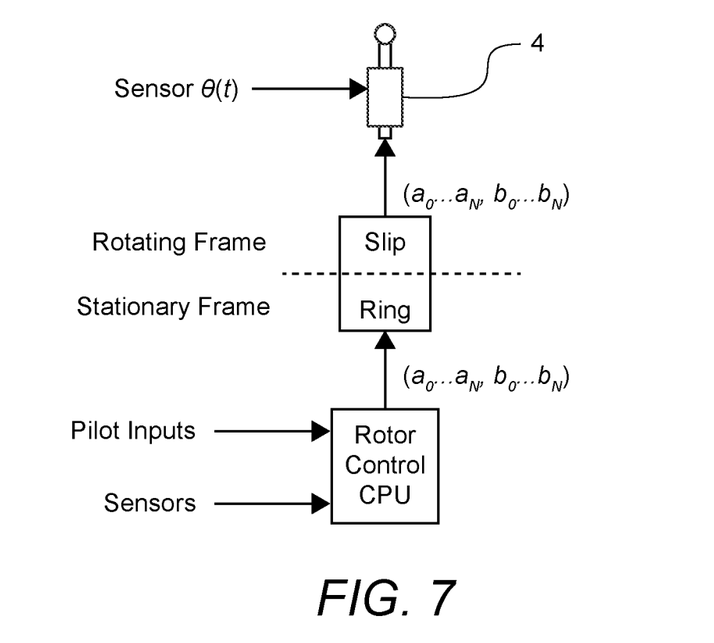
FIG. 7 is a diagrammatic representation of the subject control implementation for an IBC actuator, either mounted "above" the swashplate or in a no-swashplate configuration, using harmonic decomposition for greater signal integrity in the transition from the static frame to the rotating frame and to enable greater accuracy for control following. The harmonic content of the control signal or the frequency domain control signal is passed through a slip ring (or equivalent device, e.g., optical or RF communications) with the signal remaining in the frequency domain as it is conveyed to the actuator.

The previous figures FIG. 1 through FIG. 6, all describe configurations that have either been implemented on rotorcraft or have been well described in the literature. FIG. 7 begins to describe the subject invention. Notice that it is similar to the previous configuration except that the translation back to the time domain is never performed and the IBC actuator 4 itself receives the harmonic components describing the desired blade pitch (or twist) trajectory. Again, the actuator is assumed to be inclusive of the electronic rotor blade controller, whether collocated or not. It is not simply the case that computational processing does the translation internal to the actuator 4. The control algorithm is based on the decomposed harmonic content as described by the harmonic components $a_n$, $b_n$. and the azimuth signal $\theta(t)$.

The advantage here is that control algorithms that produce higher accuracy are enabled. That is, the error or difference between the desired blade pitch and the achieved blade pitch can be reduced. To see this, consider a standard PID controller applied to the time domain signal $f(t)$ without trajectory control. Instantaneous feedback is used to reduce the blade pitch error. The feedback is on the instantaneous position versus the desired position at that time and also on the achieved velocity versus either the desired velocity or a fixed velocity, often taken as zero. The integral term tracks the summed error over time but is challenged by the rapidly changing desired position. With this standard approach, the repeated results of the rotor blade 1 achieved position are not fully utilized to improve the accuracy of the actuator 4 tracking to the desired trajectory. Also, a feedforward control signal is not easily enabled, though the future desired position, velocity, and acceleration are known; the future desired position is not used in the control to anticipate the motion and present a control signal ahead of the time the desired position is intended to be reached.

Now consider using the full desired trajectory as described by harmonic components multiplying sine and cosine functions. The desired position and the higher derivatives are easily calculated, being simply related to multiples of sine and cosine functions of discrete frequency, $\sin n\theta$, $\cos n\theta$, where $n=\{0, 1, 2 \ldots N\}$. That is, the velocity, acceleration, and higher derivatives are simply related to the integer indexed sinusoidal functions. Feedback on desired position and desired velocity are simply enabled and a simple feedforward control signal is embodied by the acceleration term that anticipates future velocity and position commands. In this way, not only is the control simplified but it can be more accurate because of the additional availability of control signals.

Another way in which a trajectory-based control can improve tracking accuracy is through a discretized integral term making use of the repeated motion at each azimuth. Rather than employing the typical running integral, the error can be summed at each repeated azimuth location. One implementation involves dividing the azimuth into bins and summing the error at each azimuth location bin as the rotor blade revolves and revisits that azimuth location each time it goes around. The summed or running integral at each bin azimuth location can then be used to improve the accuracy. A method for employing the binned integral errors is to relate these back to harmonic components multiplying $\sin n\theta$ and $\cos n\theta$. Indeed, this allows a simple method of interpolating (smoothing out) the discreet bins.

Figure 8:
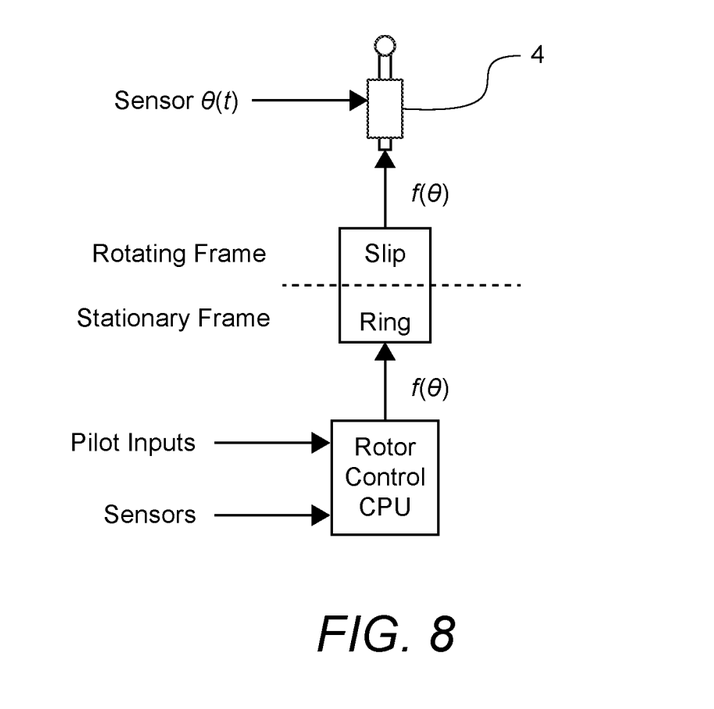
FIG. 8 is a diagrammatic representation of the subject control implementation for an IBC actuator, either mounted "above" the swashplate or in a no-swashplate configuration, using a generic parameterized control signal for greater signal integrity in the transition from the static frame to the rotating frame and to enable greater accuracy for control following. The frequency domain control signal is passed through a slip ring (or equivalent device, e.g., optical or RF communications) with the signal remaining in the frequency domain as it is conveyed to the actuator.

FIG. 8 generalizes the scheme to consider trajectory descriptions $f(\theta)$ that are not necessarily decomposed in terms of harmonic components but still represent an advantage to transmission through a slip ring and enabling the trajectory control. A simple example might be a list of $f(\theta)$ at discreet values of $\theta$ at even intervals around the azimuth, every 5 degrees for example. This would still be a more slowly varying signal that could be transmitted across the lower bandwidth or less reliable communications channel of the slip ring. The point here is that the invention does not necessarily rely on harmonic decomposition, though that does have some advantages. It is relevant for any generic description of the blade pitch (twist) trajectory around azimuth or related parameter.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. An aircraft having a trajectory-based position control comprising:
   a first rotor assembly having at least first and second rotor blades,
   a first actuator configured to provide individual control actuation on at least the first rotor blade;
   an electronic rotor blade controller configured to use the first actuator to control a subsequent blade trajectory of the first rotor blade as a function of at least one of a prior pitch velocity, a prior pitch acceleration, and a prior pitch jerk of the first rotor blade.

2. The aircraft of claim 1, wherein the subsequent and prior blade trajectories comprise amplitude of pitch of the first rotor.

3. The aircraft of claim 1, wherein the subsequent and prior blade trajectories comprise amplitude of twist of the first rotor.

4. The aircraft of claim 1, wherein the electronic rotor blade controller is further configured to utilize a parametrized surrogate for at least one of an amplitude of blade pitch and an amplitude of blade twist.

5. The aircraft of claim 4, wherein the parametrized surrogate comprises amplitude of actuator extension.

6. The aircraft of claim 1, wherein the electronic rotor blade controller is further configured to control the subsequent blade trajectory of the first rotor as an additional function of accumulated errors from repeated rotations of the first rotor.

7. The aircraft of claim 1, wherein the electronic rotor blade controller is further configured to control the subsequent blade trajectory of the first rotor as an additional function of a second order azimuth or time derivative of a prior blade trajectory.

8. The aircraft of claim 1, further comprising an actuator configured to physically move an aspect upon the first rotor, and an actuator drive module having a processor configured to implement the individual control actuation through the actuator.

9. The aircraft of claim 8, wherein the processor is further configured to utilize a feed forward term to implement the individual control actuation.

10. A method of reducing vibration, or optimizing another parameter, in a rotorcraft having a rotor assembly with at least first and second rotor blades, comprising:

- using individual blade control (IBC) to control blade pitches of the first blade in a current rotation based upon of at least one of a pitch velocity, a pitch acceleration, and a past pitch jerk of the first blade during a previous rotation;
- using individual blade control (IBC) to control blade pitches of the second blade in the current rotation based upon of at least one of a pitch velocity, a pitch acceleration, and a past pitch jerk of the second blade during the previous rotation;
- providing feedback with respect to operation of at least the first blade in the current rotation; and
- utilizing the feedback to control blade trajectories of at least the first blade in a still later rotation.

11. The method of claim 10, further comprising calculating the amplitudes of blade trajectories of at least the first blade within azimuth segments of any of the current, subsequent, and later rotations.

12. The method of claim 11, further comprising optimizing the IBC as a further function of accumulated errors from repeated cycles through the segments.

13. The method of claim 10, further comprising providing the feedback under time-varying loads.

\* \* \* \* \*